(12) United States Patent
Shibahara et al.

(10) Patent No.: US 10,970,391 B2
(45) Date of Patent: Apr. 6, 2021

(54) CLASSIFICATION METHOD, CLASSIFICATION DEVICE, AND CLASSIFICATION PROGRAM

(71) Applicant: NIPPON TELEGRAPH AND TELEPHONE CORPORATION, Chiyoda-ku (JP)

(72) Inventors: Toshiki Shibahara, Musashino (JP); Takeshi Yagi, Musashino (JP); Mitsuaki Akiyama, Musashino (JP); Daiki Chiba, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 234 days.

(21) Appl. No.: 15/770,696

(22) PCT Filed: Oct. 18, 2016

(86) PCT No.: PCT/JP2016/080830
§ 371 (c)(1),
(2) Date: Apr. 24, 2018

(87) PCT Pub. No.: WO2017/094377
PCT Pub. Date: Jun. 8, 2017

(65) Prior Publication Data
US 2019/0065743 A1  Feb. 28, 2019

(30) Foreign Application Priority Data
Nov. 30, 2015  (JP) .............................. JP2015-233345

(51) Int. Cl.
*G06F 21/56* (2013.01)
*G06F 16/00* (2019.01)

(52) U.S. Cl.
CPC .............. *G06F 21/56* (2013.01); *G06F 16/00* (2019.01)

(58) Field of Classification Search
CPC ................................ G06F 21/56; G06F 16/00
(Continued)

(56) References Cited

U.S. PATENT DOCUMENTS

2008/0256230 A1* 10/2008 Handley ............... H04L 63/145
709/224
2009/0199296 A1 8/2009 Xie et al.
(Continued)

FOREIGN PATENT DOCUMENTS

CN 102984140 B 6/2015
JP 2013-174959 A 9/2013

OTHER PUBLICATIONS

Kinable, "Malware Classification based on Call Graph Clustering", Aug. 2010, Aalto University, p. 1-12 (Year: 2010).*
(Continued)

*Primary Examiner* — Taghi T Arani
*Assistant Examiner* — Gregory A Lane
(74) *Attorney, Agent, or Firm* — Oblon, McClelland, Maier & Neustadt, L.L.P.

(57) ABSTRACT

A classification device constructs tree structure data in which attribute information relating to a single communication or multiple communications serves as a terminal node, from a series of communications with a single communication destination or multiple communication destinations that take place when software is executed, calculates attribute information on a higher node on the basis of attribute information on the terminal node, and classifies the software by specifying the type of the software on the basis of attribute information on the highest node.

8 Claims, 10 Drawing Sheets

(58) Field of Classification Search
USPC .......................................................... 726/23
See application file for complete search history.

(56) References Cited

U.S. PATENT DOCUMENTS

| | | | | |
|---|---|---|---|---|
| 2010/0146041 | A1* | 6/2010 | Gentry | G06F 15/173 709/203 |
| 2011/0283361 | A1 | 11/2011 | Perdisci et al. | |
| 2017/0024660 | A1* | 1/2017 | Chen | G06F 21/552 |

OTHER PUBLICATIONS

Extended European Search Report dated Mar. 29, 2019 in the corresponding European Patent Application No. 16 870 317.1 citing documents AA and AO therein 7 pages.

International Search Report dated Nov. 29. 2016, in PCT/JP2016/080830 filed Oct. 18, 2016.

Perdisci. R. et al., "Behavioral Clustering of HTTP-Based Malware and Signature Generation using Malicious Network Traces", USENIX, http://static.usenix.org/event/nsdi10/tech/full papers/perdisci.pdf, (2010), pp. 1-14.

Kolter, J. Z. et al., "Learning to Detect and Classify Malicious Executables in the Wild", Journal of Machine Learning Research, vol. 7, (2006), pp. 2721-2744.

Kong. D. et al., "Discriminant Malware Distance Learning on Structural Information for Automated Malware Classification", Proceedings of the $19^{TH}$ ACM SIGKDD International Conference on Knowledge Discovery and Data Mining, (2013), pp. 1357-1365.

Reck, K. et al., "Learning and Classification of Malware Behavior", DIMVA, (2008), pp. 108-125.

Xiao, H. et al., "A Supervised Topic Transition model for Detecting Malicious System Call Sequences", Proceedings of the 2011 Workshop on Knowledge Discovery, Modeling and Simulation, (2011), 8 pages.

Nari, S. et al., "Automated Malware Classification based on Network Behavior", 2013 International Conference on Computing, Networking and Communications, Communications and Information Security Symposium. (2013), pp. 642-647.

Mizutani. M. et al., "Rook: Multi-Session based Network Security Event Detector", International Symposium on Applications and the Internet, (2008). pp. 48-54.

* cited by examiner

FIG.2

| SERIAL NUMBER | TIME | PROTOCOL | NAME RESOLUTION DOMAIN | COMMUNICATION DESTINATION DOMAIN | HTTP METHOD | ... |
|---|---|---|---|---|---|---|
| 1 | 4 | DNS | example.com | | | |
| | 7 | HTTP | | example.com | GET | |
| | 10 | DNS | example.co.jp | | | |
| 2 | 15 | DNS | example2.com | | | |
| | 17 | HTTP | | example2.com | GET | |
| | 22 | HTTP | | example2.com | POST | |
| ⋮ | | | | | | |

FIG.3

| SERIAL NUMBER | LABEL | TIME | PROTOCOL | NAME RESOLUTION DOMAIN | COMMUNICATION DESTINATION DOMAIN | HTTP METHOD | ... |
|---|---|---|---|---|---|---|---|
| 1 | WORM | 4 | DNS | example3.com | | | |
| | | 9 | HTTP | | example3.com | GET | |
| | | 11 | DNS | example2.co.jp | | | |
| 2 | VIRUS | 19 | DNS | example4.com | | | |
| | | 23 | HTTP | | example4.com | GET | |
| | | 26 | HTTP | | example4.com | POST | |
| ... | | | | | | | |

CLASSIFICATION METHOD, CLASSIFICATION DEVICE, AND CLASSIFICATION PROGRAM

FIELD

The present invention relates to a classification method, a classification device, and a classification program.

BACKGROUND

Conventionally, methods of classifying malware, which is malicious software, by specifying the type of malware have been known. Such methods of classifying malware can be broadly grouped into a method based on a malware code, a method based on the behavior of malware on a host, and a method based on the behavior of malware on a network.

The method based on a malware code includes a method of classifying malware by extracting an n-gram feature on the basis of the number of times a series of words have appeared, from a code that is obtained by disassembling the malware, and by using machine learning (for example, refer to Non Patent Literature 1). Another method includes a method of classifying malware by creating a dependency graph of a function to be used from the code obtained by disassembling the malware, and by defining the distance of the graph (for example, refer to Non Patent Literature 2).

The method based on the behavior of malware on a host includes a method of classifying malware by calculating a feature of a specific character string appearing on a report that is generated when malware is analyzed using a sandbox system called CWSandBox capable of safely analyzing malware, and by using machine learning (for example, refer to Non Patent Literature 3). Another method includes a method of classifying malware by applying a topic model, which is a method for estimating the topic of text, to the time series of an application programming interface (API) that is called when malware is executed (for example, refer to Non Patent Literature 4).

In the method based on the behavior of malware on a network, a graph is created by setting individual communication of malware as a node, and by creating an edge on the basis of dependence such as implementation of a hyper text transfer protocol (HTTP) communication based on domain name system (DNS) name resolution. The method calculates the size of the graph, the average of the number of edges of the node, or the like as features, and uses machine learning (for example, refer to Non Patent Literature 5). Another method includes a method of detecting malware by extracting a characteristic communication pattern of malware and creating a signature (for example, refer to Non Patent Literature 6).

CITATION LIST

Non Patent Literature

Non Patent Literature 1: Kolter, J. Z. and Maloof, M. A., "Learning to detect and classify malicious executables in the wild.", The Journal of Machine Learning Research, Vol. 7, pp. 2721-2744, 2006

Non Patent Literature 2: Kong, D. and Yan, G., "Discriminant malware distance learning on structural information for automated malware classification.", in Proceedings of the 19$^{th}$ ACM SIGKDD international conference on Knowledge discovery and data mining, 2013, pp. 1357-1365.

Non Patent Literature 3: Rieck, K., Holz, T., Willems, C., Dussel, P. and Laskov, P., "Learning and classification of malware behavior.", in Detection of Intrusions and Malware, and Vulnerability Assessment, 2008, pp. 108-125.

Non Patent Literature 4: Xiao, H. and Stibor, T., "A supervised topic transition model for detecting malicious system call sequences.", in Proceedings of the 2011 workshop on Knowledge discovery, modeling and simulation, 2011, pp. 23-30.

Non Patent Literature 5: Nari, S., et al., "Automated malware classification based on network behavior.", in International Conference on Computing, Networking and Communications, 2013, pp. 642-647.

Non Patent Literature 6: Mizutani, M., Shirahata, S., Minami, M. and Murai, J., "Rook: Multi-session based network security event detector.", in International Symposium on Applications and the Internet, 2008, pp. 48-54.

SUMMARY

Technical Problem

However, in the conventional technologies described above, there are cases that malware cannot be suitably classified because malware features cannot be suitably extracted. For example, in the method based on a malware code, it is considered that malware cannot be suitably classified when the malware is obfuscated, because malware features cannot be extracted. In the method based on the behavior of malware on a host, it is considered that malware cannot be suitably classified when the malware has a function of detecting analysis environment from a registry name and a file name, and not showing malicious behavior upon detecting the analysis environment, because malicious behavior features cannot be extracted.

On the other hand, the method based on the behavior of malware on a network is considered to be not affected by obfuscation because malware is actually executed, and not affected by the detection of analysis environment because it requires only a device for monitoring malware traffic to collect information. The behavior of malware on a network includes time series features such as that malware starts attacking after communicating with a C & C server. However, an attack target and the number of attack targets differ depending on a command to be transmitted from the C & C server. Thus, the time series analysis needs to be performed in a flexible manner to extract this feature. However, the conventional technologies cannot perform the time series analysis in a flexible manner because the sequence of communications is not taken into account in the methods, and the methods are based on a fixed signature that is prepared in advance. Consequently, there is a need to construct a method of classifying malware by extracting time series features of malware on a network using the time series analysis in a flexible manner.

Solution to Problem

A classification method executed by a classification device, the classification method includes: a step of constructing tree structure data in which attribute information relating to a single communication or multiple communications serves as a terminal node, from a series of communications with a single communication destination or multiple communication destinations that take place when software is executed; a step of calculating attribute information on a higher node based on attribute information on the terminal node; and a step of classifying the software by specifying a type of the software based on attribute information on a highest node.

A classification device, includes: a construction unit that constructs tree structure data in which attribute information relating to a single communication or multiple communications serves as a terminal node, from a series of communications with a single communication destination or multiple communication destinations that take place when software is executed; a calculation unit that calculates attribute information on a higher node based on attribute information on the terminal node; and a classification unit that classifies the software by specifying a type of the software based on attribute information on a highest node.

A classification program for causing a computer to execute: a step of constructing tree structure data in which attribute information relating to a single communication or multiple communications serves as a terminal node, from a series of communications with a single communication destination or multiple communication destinations that take place when software is executed; a step of calculating attribute information on a higher node based on attribute information on the terminal node; and a step of classifying the software by specifying a type of the software based on attribute information on a highest node.

Advantageous Effects of Invention

The present invention can advantageously extract malware features, and suitably classify malware.

BRIEF DESCRIPTION OF DRAWINGS

FIG. 2 is a diagram illustrating an example of information relating to communication of software to be identified.

FIG. 3 is a diagram illustrating an example of information relating to communication of known software.

DESCRIPTION OF EMBODIMENTS

Hereinafter, an embodiment of a classification method, a classification device, and a classification program according to the present application will be described in detail with reference to the accompanying drawings. It is to be noted that the classification method, the classification device, and the classification program according to the present application are not limited to the embodiment.

Embodiment

In the following embodiment, a configuration and a processing flow of a classification device according to the embodiment will be sequentially described. Then, the effects of the embodiment will be described at the end.

Configuration of Classification Device

Figure 1:
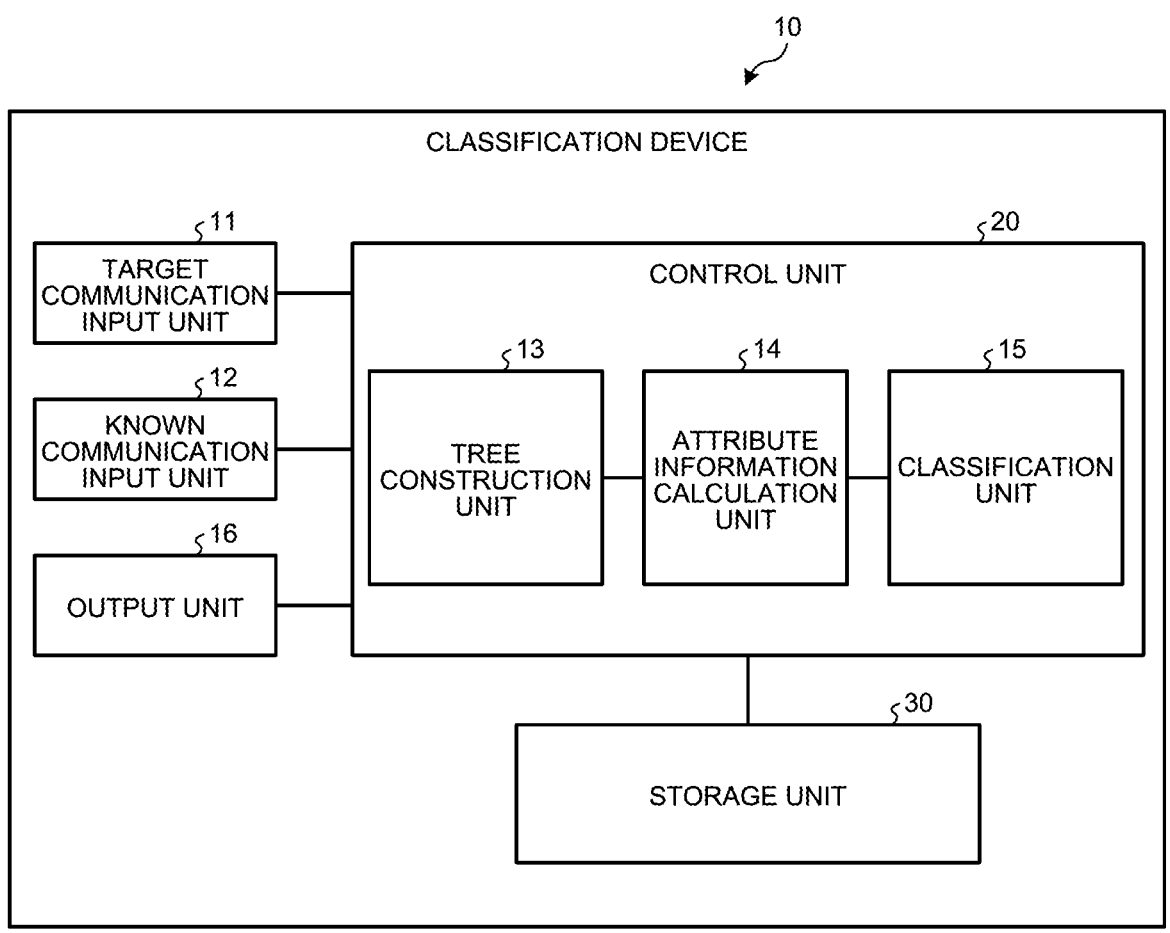
FIG. 1 is a configuration diagram illustrating an outline of a classification device according to the present embodiment.

First, a configuration of a classification device 10 will be described with reference to FIG. 1. FIG. 1 is a configuration diagram illustrating an outline of a classification device according to the present embodiment. As illustrated in FIG. 1, the classification device 10 includes a target communication input unit 11, a known communication input unit 12, an output unit 16, a control unit 20, and a storage unit 30.

The target communication input unit 11 allows, as an input, communication of software to be classified. The known communication input unit 12 allows, as an input, communication of known software that is software of a known type. The output unit 16 outputs a classification model, which will be described below, or a classification result.

The storage unit 30 stores therein data and computer programs that are required when the control unit 20 performs various processes. In particular, as those closely related to the present invention, the storage unit 30 stores therein information input from the target communication input unit 11 and the known communication input unit 12. For example, the storage unit 30 is a semiconductor memory element such as a random access memory (RAM) and a flash memory, or a storage device such as a hard disk and an optical disc.

Information that is to be input by the target communication input unit 11 and that is relating to communication stored in the storage unit 30 will now be described with reference to FIG. 2. FIG. 2 is a diagram illustrating an example of information relating to communication of software to be identified. As illustrated in FIG. 2, the storage unit 30 stores therein a "serial number" for identifying a series of communications with a communication destination that take place when software is executed, "time" indicating a time at which communication has taken place, a "protocol" indicating a protocol of communication that has taken place, a "name resolution domain" indicating a domain name that has performed name resolution, a "communication destination domain" indicating a communication destination domain of communication that has taken place, and an "HTTP method" indicating an HTTP method name when the communication that has taken place is HTTP communication, in an associated manner. The time in FIG. 2 indicates how many seconds after a predetermined time the communication has taken place, on the basis of the predetermined time. For example, when "4" is indicated in the time, it means that the communication has taken place "4" seconds after the predetermined time.

DNS and HTTP can be used as a protocol. However, it is not limited thereto, and the Simple Mail Transfer Protocol (SMTP), the Secure Sockets Layer (SSL), the Transmission Control Protocol (TCP), and the User Datagram Protocol (UDP) may also be used as a protocol. It is to be noted that the time information may be replaced with communication order. In FIG. 2, the time information is essential as information relating to the communication described above. In FIG. 2, the protocol, the name resolution domain, the communication destination domain, the HTTP method, and the like are also illustrated as the information relating to the communication described above. However, it is not limited thereto, and the storage unit 30 may also store therein a port number, the number of IP addresses corresponding to a domain, the size of an HTTP response, a uniform resource locator (URL), and the like.

The information illustrated in FIG. 2 preferably includes at least the contents of FIG. 3, which will be described below. However, when the information illustrated in FIG. 2 does not include the contents of FIG. 3, the information not being included may be classified and handled as a blank field, for example. These types of information are also input via an external interface of the target communication input unit 11. The information may be automatically input from an external function or manually input by an operator.

These types of information may also be generated from a communication log stored in a device such as a packet capture (pcap) and syslog. A data conversion program is required to generate these types of information from the communication log. The target communication input unit 11 or an external function may store the data conversion program. The serial numbers are collectively given to communications that have taken place in 1 malware sample and may not overlap.

Next, information that is to be input by the known communication input unit 12 and that is relating to communication stored in the storage unit 30 will be described with reference to FIG. 3. FIG. 3 is a diagram illustrating an example of information relating to communication of known software. As illustrated in FIG. 3, the storage unit 30 stores therein a "serial number" for identifying a series of communications with a communication destination that take place when software is executed, a "label" indicating the type of known software that is software of a known type, "time" indicating a time at which communication has taken place, a "protocol" indicating a protocol of communication that has taken place, a "name resolution domain" indicating a domain name that has performed name resolution, a "communication destination domain" indicating a communication destination domain of communication that has taken place, and an "HTTP method" indicating an HTTP method name when communication that has taken place is HTTP communication, in an associated manner.

In FIG. 3, the time information is essential as information relating to the communication described above. In FIG. 3, the protocol, the name resolution domain, the communication destination domain, the HTTP method, and the like are also illustrated as the information relating to the communication described above. However, it is not limited thereto. It is to be noted that the time information may be replaced with communication order.

In the present invention, a protocol includes DNS, HTTP, and SMTP. However, it is not limited thereto. The label for identifying the features of software is also applied to each communication. The label is not limited to "worm" or "virus" as illustrated in the drawing, and may be "back door", "downloader", "spyware", and the like.

These types of information may also be input via an external interface of the known communication input unit 12. The information may be automatically input from an external function, or may be manually input by an operator.

These types of information may also be generated from an analysis log stored in a device for collecting communication destinations of known software, the device represented by a sandbox and a malware dynamic analysis system, for example. A data conversion program is required to generate these types of information from the analysis log. The known communication input unit 12 or an external function may store the data conversion program. The serial numbers are collectively given to communications that have taken place in 1 malware sample and may not overlap.

Returning to the explanation of FIG. 1, the control unit 20 includes an internal memory for storing computer programs in which various processing procedures and the like are defined, and necessary data. The control unit 20 executes various processes using the computer programs and data. In particular, as those closely related to the present invention, the control unit 20 includes a tree construction unit 13, an attribute information calculation unit 14, and a classification unit 15. The tree construction unit 13 constructs a tree in which attribute information relating to a single communication or multiple communications serves as a terminal node, from communications input via the target communication input unit 11 and the known communication input unit 12. The attribute information calculation unit 14 calculates attribute information on a higher node in a tree constructed by the tree construction unit 13 on the basis of attribute information on a lower node. The classification unit 15 classifies software by using attribute information on the highest node calculated by the attribute information calculation unit 14. Detailed descriptions of each unit are given below.

The tree construction unit 13 constructs tree structure data (hereinafter, referred to as a "tree" as appropriate) in which attribute information relating to a single communication or multiple communications serves as a terminal node, from a series of communications with a single communication destination or multiple communication destinations that take place when software is executed. The tree construction unit 13 constructs tree structure data when a classification model is created or when software to be classified is classified using the classification model. When the classification model is created, the tree construction unit 13 constructs tree structure data from a series of communications with a single communication destination or multiple communication destinations that take place when known software that is software of a known type input via the known communication input unit 12 is executed. When software to be classified is classified using a classification model, the tree construction unit 13 constructs tree structure data on the basis of communication information input via the target communication input unit 11.

The tree construction unit 13 constructs tree structure data by using one of the following three methods of constructing tree structure data, for example: a method of constructing a tree by creating a higher node relative to nodes with close communication occurrence times; a method of constructing a tree by creating a higher node relative to nodes with earlier communication occurrence times; and a method of constructing a tree for each serial number by creating a higher node relative to nodes with highly similar attribute information. It is possible to optionally select which of the three methods described above to use.

For example, the tree construction unit 13 constructs tree structure data by repeating a process of creating a new higher node relative to two nodes with the closest communication occurrence times among terminal nodes on the basis of attribute information on the two nodes, and creating a new higher node relative to two nodes with the closest times among nodes that do not have a higher node including a newly created node on the basis of attribute information on the two nodes.

An example of constructing a tree by creating a higher node relative to nodes with close communication occurrence times will now be described with reference to FIG. 4. In this example, a tree in which a single communication or multiple communications serve as a terminal node is constructed for each serial number on the basis of communication information input via the target communication input unit 11 or communication information input via the known communication input unit 12.

Figure 4:
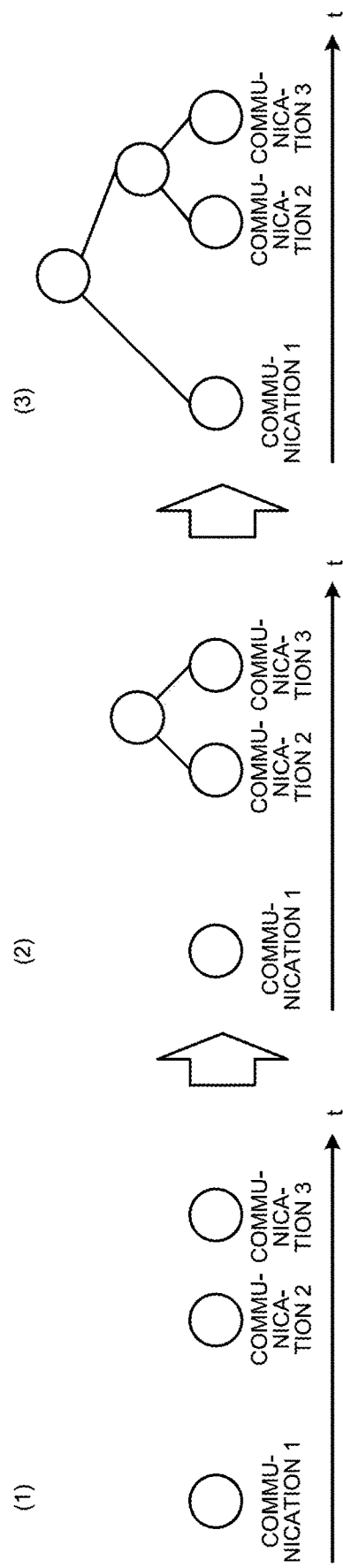
FIG. 4 is a diagram for explaining an example of constructing a tree by creating a higher node relative to nodes with close communication occurrence times.

For example, a node corresponding to a single communication or multiple communications is placed at the position of a terminal node in the order in which communications occur (refer to (1) in FIG. 4). When multiple communications serve as a single node, the time of the node may be the average of the communications, the time of the first communication, the time of the last communication, and the like. For example, when communications are put together for each communication destination domain, it is considered that the behavior of malware can be effectively expressed because it is possible to extract what is considered to be the behavior of malware such as confirmation of communication environment, reception of an attack command, transmission of information relating to a victim, and information on an attack. It is also possible to reduce the calculation cost because the number of nodes is reduced.

Next, a higher node is created for two nodes with the closest times by calculating a time difference between adjacent nodes among the nodes that do not have a higher node (refer to (2) in FIG. 4). The time of the higher node may be the average time of lower nodes, the time of one of the lower nodes, or the like. This process is repeated on the nodes that do not have a higher node including a newly created node until all the terminal nodes belong to a single tree (refer to (3) in FIG. 4). When a table contains information on communications having the same time, the communications are treated as having taken place in the described order.

It is considered that communication of malware will shift to the next communication after communication for a specific purpose is taken place and the result is processed. In other words, it is considered that communications for the same purpose take place at a short interval. Thus, it is considered that the process is valid unless an operation of temporarily stopping the behavior or an operation of causing irrelevant communication, which is performed by malware to interfere with analysis, is embedded.

For example, the tree construction unit 13 may also construct tree structure data by repeating a process of creating a new higher node relative to a node with the earliest communication occurrence time and a node with the second earliest communication occurrence time among the terminal nodes on the basis of attribute information on the two nodes, and creating a new higher node relative to a node with the earliest communication occurrence time and a node with the second earliest communication occurrence time among the nodes that do not have a higher node including a newly created node on the basis of attribute information on the two nodes.

An example of constructing a tree by creating a higher node relative to nodes with close communication occurrence times will be described with reference to FIG. 5. In this example, a tree in which a single communication or multiple communications serve as a terminal node is constructed for each serial number on the basis of the communication information input via the target communication input unit 11 or the communication information input via the known communication input unit 12.

Figure 5:
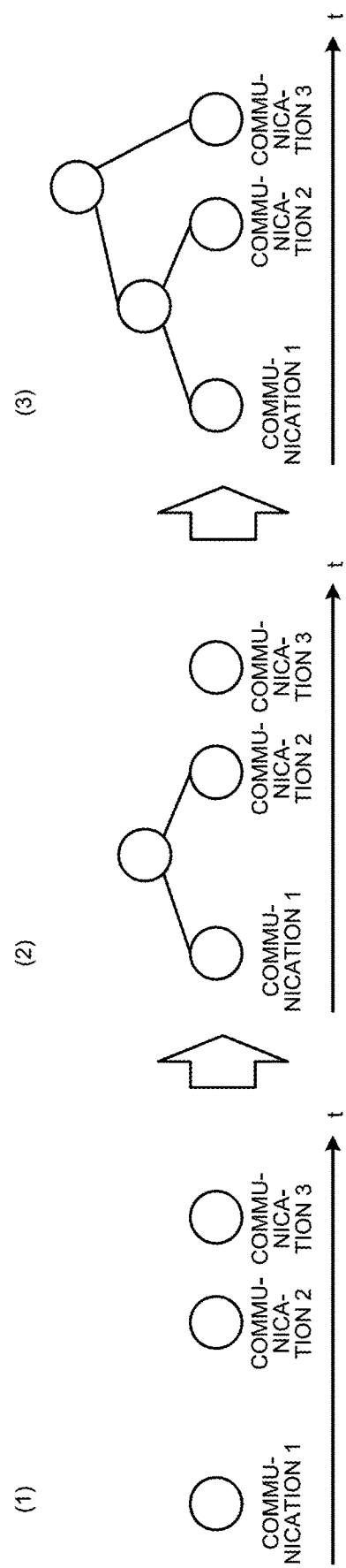
FIG. 5 is a diagram for explaining an example of constructing a tree by creating a higher node relative to nodes with earlier communication occurrence times.

For example, a node corresponding to a single communication or multiple communications is placed at the position of a terminal node in the order in which communications occur (refer to (1) in FIG. 5). When multiple communications serve as a single node, the time of the node may be the average of the communications, the time of the first communication, the time of the last communication, and the like. For example, when communications are put together for each communication destination domain, it is considered that the behavior of malware can be effectively expressed because it is possible to extract what is considered to be the behavior of malware such as confirmation of communication environment, reception of an attack command, transmission of information relating to a victim, and information on an attack. It is also possible to reduce the calculation amount because the number of nodes is reduced.

Next, a higher node relative to two nodes with the earliest time of node is created among the nodes that do not have a higher node (refer to (2) in FIG. 5). The time of the higher node may be the average time of lower nodes, the time of one of the lower nodes, or the like. This process is repeated on the nodes that do not have a higher node including a newly created node until all the terminal nodes belong to a single tree (refer to (3) in FIG. 5). When a table contains information on communications having the same time, the communications are treated as having taken place in the described order.

Malware interferes with analysis by inserting an operation of temporarily stopping the behavior of malware at random. In this case, it is considered that when the nodes are joined on the basis of communication interval, estimation will not work because nodes with different purposes are joined together first. In such a case, it is considered possible to minimize the effects by joining nodes with earlier communication occurrence times first.

For example, the tree construction unit 13 may also construct tree structure data by repeating a process of creating a new higher node relative to two nodes with highly similar attribute information among the terminal nodes on the basis of attribute information on the two nodes, and creating a new higher node relative to two nodes with highly similar attribute information among the nodes that do not have a higher node including a newly created node on the basis of attribute information on the two nodes.

An example of constructing a tree by creating a higher node relative to nodes with highly similar attribute information will be described with reference to FIG. 6. In this example, a tree in which a single communication or multiple communications serve as a terminal node is constructed for each serial number on the basis of communication information input via the target communication input unit 11 or communication information input via the known communication input unit 12.

Figure 6:
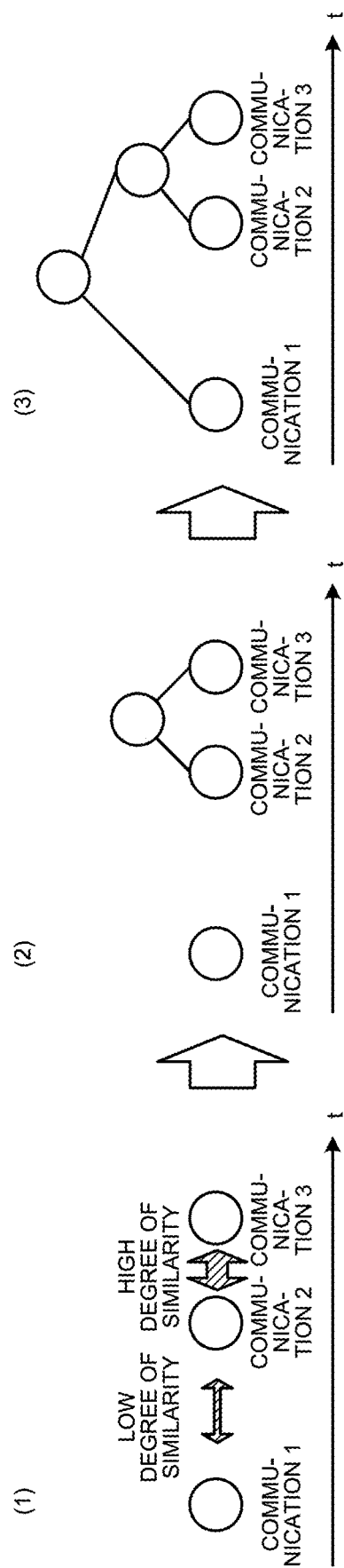
FIG. 6 is a diagram for explaining an example of constructing a tree by creating a higher node relative to nodes with highly similar attribute information.

For example, a node corresponding to a single communication or multiple communications is placed at the position of a terminal node in the order in which communications occur (refer to (1) in FIG. 6). When multiple communications serve as a single node, the time of the node may be the average of the communications, the time of the first communication, the time of the last communication, and the like. For example, when communications are put together for each communication destination domain, it is considered that the behavior of malware can be effectively expressed because it is possible to extract what is considered to be the behavior of malware such as confirmation of communication environment, reception of an attack command, transmission of information relating to a victim, and information on an attack. It is also possible to reduce the calculation amount because the number of nodes is reduced.

Next, a higher node relative to two nodes with the most similar node attribute information is created among the nodes that do not have a higher node (refer to (2) in FIG. 6). The degree of similarity between a higher node and a terminal node can be obtained by calculating the degree of similarity between each of the nodes (nodes corresponding to communication 2 and communication 3) joined to the higher node, and the terminal node (node corresponding to communication 1). The degree of similarity may be the maximum value, the minimum value, the average value, and the like.

The degree of similarity between higher nodes can be obtained by calculating degrees of similarity between lower nodes of all combinations, and may be the maximum value, the minimum value, the average value, and the like. The node attribute information may include the number of IP addresses corresponding to a domain, ratio of numbers in a domain, the number of communications of each protocol, and the like.

As a method for calculating the degree of similarity, the Euclidean distance, the Manhattan distance, and the like may be used when the attribute information includes exclusively numerals, and the Jaccard coefficient may be used when category data is included. The final degree of similarity may also be calculated by taking into account the time when communication has taken place in addition to the degree of similarity in attribute information. This process is repeated on the nodes that do not have a higher node including a newly created node until all the terminal nodes belong to a single tree (refer to (3) in FIG. 6). It is also possible to prepare multiple methods for calculating the degree of similarity, and when a certain calculation method can no longer find a node with a degree of similarity equal to or larger than a threshold, another calculation method may be used to repeat the process of calculating the degree of similarity.

Malware interferes with analysis by inserting communication irrelevant to the original purpose of the malware. In this case, it is considered that estimation will not work in the method illustrated in FIG. 4 or FIG. 5 because the interfering communication and another communication are joined together first. On the other hand, in the method based on the similarity of communications, it is considered possible to suitably construct a tree because communications relating to the same purpose are considered to be similar.

Figure 7:
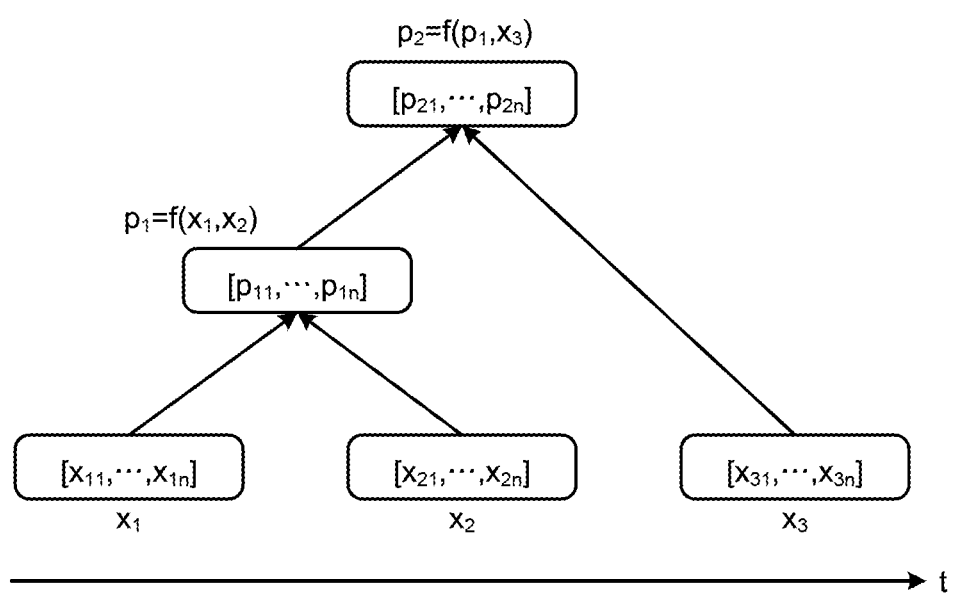
FIG. 7 is a diagram for explaining an example of a process for calculating attribute information on a higher node.

The attribute information calculation unit 14 calculates attribute information on a higher node on the basis of attribute information on terminal nodes. More specifically, to classify software to be classified using a classification model, the attribute information calculation unit 14 calculates attribute information on all higher nodes by using a specific function that receives input of the attribute information on terminal nodes and that outputs the attribute information on a higher node. An example of calculating the attribute information on a higher node will be described with reference to FIG. 7. FIG. 7 is a diagram for explaining an example of a process for calculating the attribute information on a higher node.

The attribute information calculation unit 14 calculates attribute information on a higher node on the basis of a tree constructed by the tree construction unit 13 described above. The node attribute information may include the number of IP addresses corresponding to a domain, ratio of numbers in a domain, the number of communications of each protocol, and the like. When category data is included in the attribute information, the attribute information needs to be converted to a numeric vector by setting the number of categories as dimensions, and expressing only the dimension of the category index as a vector of "1" and expressing the rest as a vector of "0", and the like. The attribute information on a higher node is calculated by a function f in which two lower nodes serve as arguments. To calculate the attribute information on higher nodes, this function f is recursively applied according to the tree structure.

Similarly, to create a classification model, the attribute information calculation unit 14 calculates attribute information on all higher nodes by using a specific function that receives input of the attribute information on terminal nodes and that outputs the attribute information on a higher node in the tree structure data constructed by the tree construction unit 13.

The classification unit 15 classifies software by specifying the type of the software on the basis of attribute information on the highest node. More specifically, when software to be classified is classified, the classification unit 15 specifies the type of malware and classifies the malware according to the type of malware by using a function that receives input of the attribute information on the highest node and that outputs the type of malware.

To create a classification model, the classification unit 15 calculates the type of software of a known type by using a function that receives input of the attribute information on the highest node and that calculates the type of software. In this example, the classification unit 15 creates a classification model by changing the specific function f and a function for calculating the type of software such that an error between the calculated type of software and the actual type of software becomes small.

Example of Process Performed by Classification Device

Figure 8:
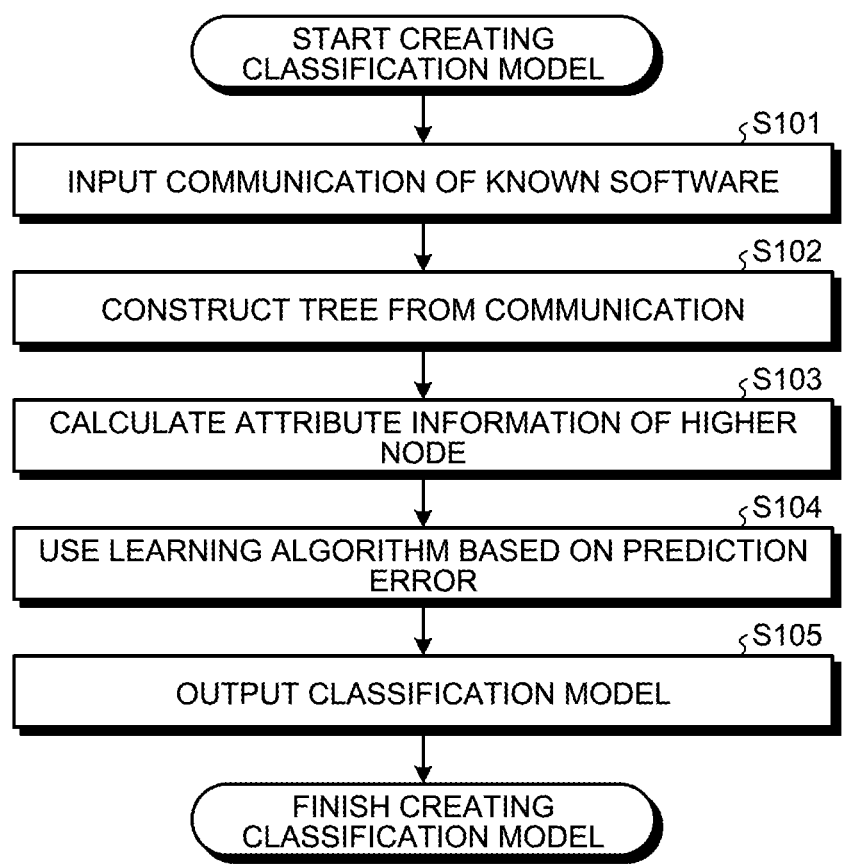
FIG. 8 is a flowchart illustrating a flow of a classification model creating process of the classification device according to the present embodiment.
Figure 9:
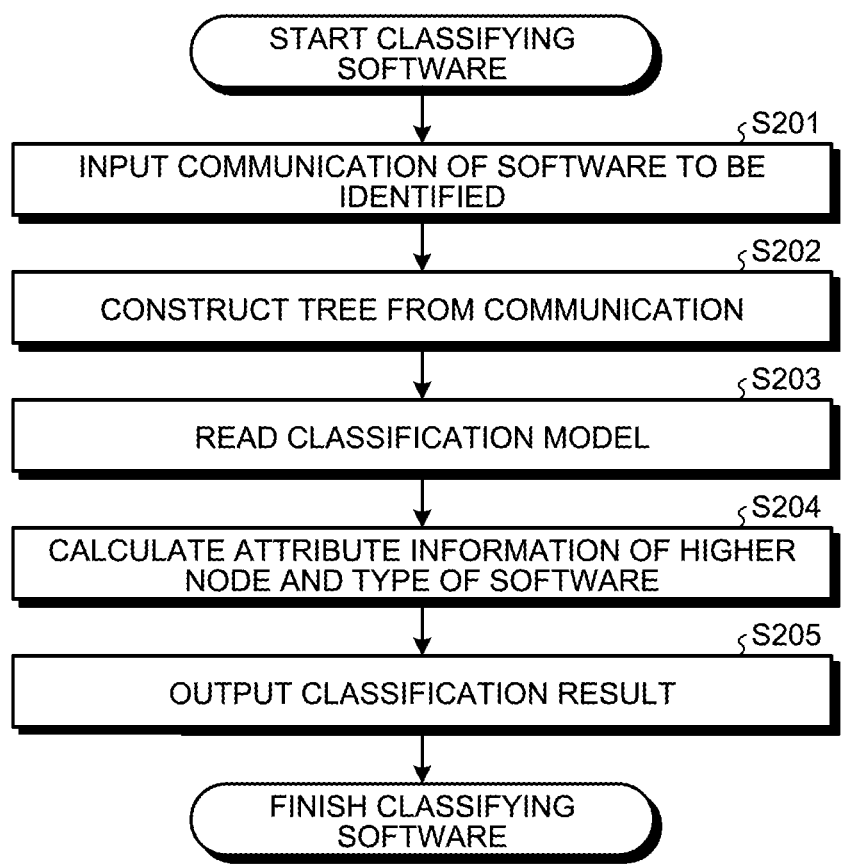
FIG. 9 is a flowchart illustrating a flow of a software classification process of the classification device according to the present embodiment.

Next, a process flow performed by the classification device 10 will be described with reference to FIG. 8 and FIG. 9. FIG. 8 is a flowchart illustrating a flow of a classification model creating process of the classification device according to the present embodiment. FIG. 9 is a flowchart illustrating a flow of a software classification process of the classification device according to the present embodiment.

First, a process of creating a classification model will be described with reference to FIG. 8. As illustrated in FIG. 8, the classification device 10 receives an input of communication information on known software that is software of a known type (step S101). The classification device 10 then constructs a tree from the communication information input via the known communication input unit 12 (step S102). The tree construction unit 13 constructs tree structure data by using one of the following methods of constructing tree structure data, for example: a method of constructing a tree by creating a higher node relative to nodes with close communication occurrence times; a method of constructing a tree by creating a higher node relative to nodes with earlier communication occurrence times; and a method of constructing a tree for each serial number by creating a higher node relative to nodes with highly similar attribute information.

Next, the classification device 10 calculates attribute information on higher nodes on the basis of the attribute information on terminal nodes. More specifically, the classification device 10 calculates the attribute information on all higher nodes by using the specific function f that receives input of the attribute information on terminal nodes and that outputs the attribute information on a higher node in the constructed tree structure data (step S103). The classification device 10 further estimates the type of software from the highest node by using a function for calculating the type of software from the attribute information.

The classification device 10 then creates the classification model described above by using a learning algorithm based on a prediction error (step S104). In other words, the classification device 10 creates the classification model by machine learning with a teacher in which the type (label) of the known software input at step S101 serves as "training data". The classification device 10 creates the classification model by changing the function for calculating the type of software from the attribute information and the function for calculating the attribute information on the higher node such that an error between the estimated software type and the actual software label becomes small. It is assumed that this process is repeated for a sufficient number of times. The classification device 10 then outputs the created classification model (step S105). In this example, the classification model includes both the function for calculating the type of software from the attribute information and the function for calculating the attribute information on higher nodes.

Next, a process of classifying software will be described with reference to FIG. 9. As illustrated in FIG. 9, the classification device 10 receives communication information on software to be identified that is input via the target communication input unit 11 (step S201). The classification device 10 then constructs tree structure data on the basis of the communication information input via the target communication input unit 11 (step S202).

The classification device 10 reads the created model described above (step S203). The classification device 10 then calculates the attribute information on all higher nodes by using the function f that receives input of the attribute information on terminal nodes and that outputs the attribute information on a higher node, and calculates the type of software by using the classification model that receives input of the attribute information on the highest node and that outputs the type of software (step S204). Subsequently, the classification device 10 outputs the classification result of the software (step S205).

Effects of Embodiment

In this manner, the classification device 10 constructs tree structure data in which attribute information relating to a single communication or multiple communications serves as a terminal node, from a series of communications with a single communication destination or multiple communication destinations that take place when software is executed; calculates attribute information on a higher node on the basis of the attribute information on the terminal node; and classifies the software by specifying the type of the software on the basis of attribute information on the highest node. Thus, the classification device 10 constructs a tree in which attribute information relating to a single communication or multiple communications with a single communication destination or multiple communication destinations serves as a terminal node, calculates attribute information on a higher node on the basis of attribute information on a lower node, and classifies the software on the basis of attribute information on the highest node. Consequently, the classification device 10 is capable of accurately classifying software without being affected by obfuscation or analysis environment detection by capturing the time series features of communication that is characteristic of software, while allowing a slight change.

As described above, the classification device 10 constructs tree structure data by using one of the following methods of constructing tree structure data, for example: the method of constructing a tree by creating a higher node relative to nodes with close communication occurrence times; the method of constructing a tree by creating a higher node relative to nodes with earlier communication occurrence times; and the method of constructing a tree for each serial number by creating a higher node relative to nodes with highly similar attribute information. Which method to use among the three methods described above can be optionally selected. For example, when an operation of temporarily stopping the behavior or an operation of causing irrelevant communication, which is performed by malware to interfere with analysis, is not embedded, the method of constructing a tree by creating a higher node relative to nodes with close communication occurrence times will be selected. For example, when an operation of temporarily stopping the behavior is inserted by malware at random to interfere with analysis, the method of constructing a tree by creating a higher node relative to nodes with earlier communication occurrence times will be selected. For example, when communication irrelevant to the original purpose of malware is inserted by the malware to interfere with analysis, the method of constructing a tree for each serial number by creating a higher node relative to nodes with highly similar attribute information will be selected. In this manner, tree structure data can be constructed by selecting the optimum method for constructing tree structure data depending on the behavior of the malware.

System Configuration and the Like

The components of the devices in the drawings are functionally conceptual, and need not necessarily be physically configured as illustrated. In other words, the specific mode of distribution and integration of the devices is not limited to the ones illustrated in the drawings, and all or a part of the devices can be functionally or physically distributed or integrated in an optional unit depending on various kinds of load and the status of use. All or an optional part of processing functions carried out in each device may be implemented by a central processing unit (CPU) and a computer program analyzed and executed by the CPU, or may be implemented as hardware by wired logic. For example, the tree construction unit 13 and the attribute information calculation unit 14 may be integrated.

Moreover, of the processes described in the present embodiment, all or a part of the processes described as being automatically performed may be manually performed, or all or a part of the processes described as being manually performed may be automatically performed with a known method. The information including the process procedure, the control procedure, specific names, and various kinds of data and parameters illustrated in the document described above and the drawings can be optionally changed unless otherwise specified.

Computer Program

It is also possible to create a computer program written in a computer executable language, for the process executed by the classification device 10 explained in the embodiment described above. For example, the process to be executed by the classification device 10 according to the embodiment may also be performed by creating a classification program written in a computer executable language. In this case, it is possible to obtain the same effects as those of the embodiment described above when a computer executes the classification program. Moreover, the same processes as those of the embodiment described above may also be implemented by recording the classification program in a computer-readable recording medium and causing a computer to read and execute the classification program recorded in the recording medium. In the following, an example of a computer that executes a classification program for implementing the same functions as those of the classification device 10 illustrated in FIG. 1 will be described.

Figure 10:
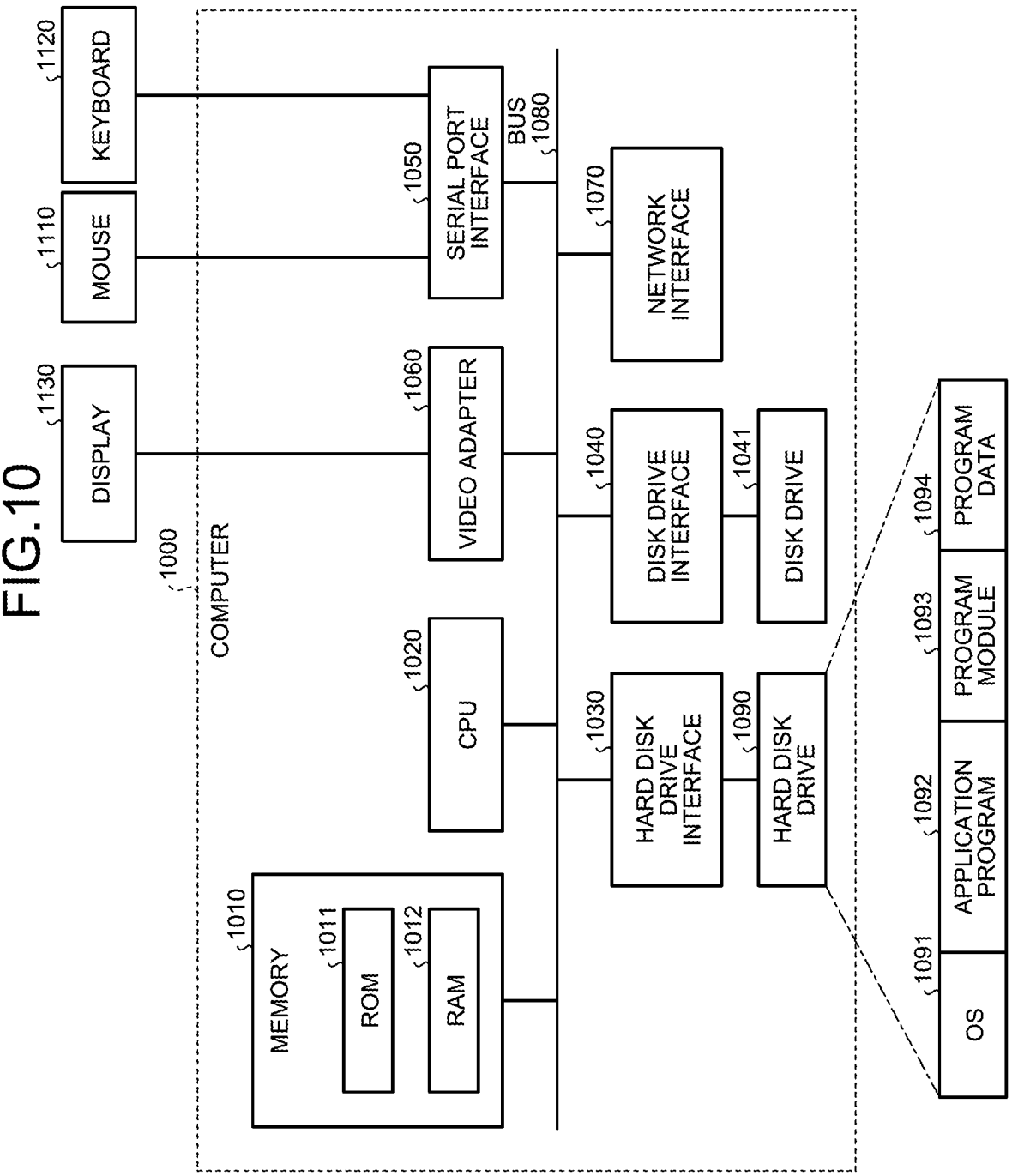
FIG. 10 is a diagram illustrating a computer for executing a classification program.

FIG. 10 is a diagram illustrating a computer 1000 that executes a classification program. As illustrated in FIG. 10, the computer 1000 includes, for example, a memory 1010, a CPU 1020, a hard disk drive interface 1030, a disk drive interface 1040, a serial port interface 1050, a video adapter 1060, and a network interface 1070, and these units are connected via a bus 1080.

As illustrated in FIG. 10, the memory 1010 includes a read only memory (ROM) 1011 and a random access memory (RAM) 1012. The ROM 1011 stores therein, for example, a boot program such as a basic input output system (BIOS). As illustrated in FIG. 10, the hard disk drive interface 1030 is connected to a hard disk drive 1090. As illustrated in FIG. 10, the disk drive interface 1040 is connected to a disk drive 1041. For example, a detachable storage medium such as a magnetic disc and an optical disc is inserted into the disk drive. As illustrated in FIG. 10, the serial port interface 1050 is connected to a mouse 1110 and a keyboard 1120, for example. As illustrated in FIG. 10, the video adaptor 1060 is connected to a display 1130, for example.

In this example, as illustrated in FIG. 10, the hard disk drive 1090 stores therein an operation system (OS) 1091, an application program 1092, a program module 1093, and program data 1094, for example. In other words, the classification program described above is stored, for example, in the hard disk drive 1090 as a program module in which commands to be executed by the computer 1000 are written.

The various types of data explained in the embodiment described above are stored, for example, in the memory 1010 and the hard disk drive 1090 as program data. The CPU 1020 executes the program module 1093 and the program data 1094 stored in the memory 1010 and the hard disk drive 1090 by reading out the program module 1093 and the program data 1094 to the RAM 1012 as necessary.

The storage of the program module 1093 and the program data 1094 relating to the classification program is not limited to the hard disk drive 1090. The program module 1093 and the program data 1094 may be stored in a detachable storage medium and read out by the CPU 1020 via the disk drive and the like, for example. Alternatively, the program module 1093 and the program data 1094 relating to the classification program may be stored in another computer connected via a network (such as a local area network (LAN) and a wide area network (WAN)), and read out by the CPU 1020 via the network interface 1070.

REFERENCE SIGNS LIST 10 classification device
11 target communication input unit
12 known communication input unit
13 tree construction unit
14 attribute information calculation unit
15 classification unit
16 output unit
20 control unit
30 storage unit

The invention claimed is:

1. A classification method executed by a classification device, the classification method comprising:
    a step of constructing tree structure data in which attribute information relating to a single communication or multiple communications serves as a terminal node, from a series of communications along a timeline with a single communication destination or multiple communication destinations that each take place at a time instance when software is executed, wherein there are a plurality of terminal nodes, and the step of constructing is performed by repeating a process of initially creating at least one higher node connecting at least two terminal nodes of the plurality of terminal nodes based on a high similarity of attribute information or a predetermined characteristic of communication occurrence times among the plurality of terminal nodes, and creating a new higher node connecting remaining nodes, including terminal nodes or higher nodes, among the current nodes in the tree structure based on a high similarity of attribute information or the predetermined characteristic of communication occurrence times among nodes that are not already connected to each other by a higher node, wherein each higher node shares the timeline with the terminal nodes;
    a step of calculating attribute information on each of the created higher nodes based on attribute information on the terminal nodes to which the respective higher node connects; and
    a step of classifying the software by specifying a type of the software based on attribute information on a highest node created in the tree structure.

2. The classification method according to claim 1, wherein the predetermined characteristic of the communication occurrence times is that the communication occurrence times under consideration are closest to each other.

3. The classification method according to claim 1, wherein the predetermined characteristic of the communication occurrence times is that the communication occurrence times are the earliest of communication occurrence times under consideration.

4. The classification method according to claim 1, wherein the step of calculating calculates attribute information on each higher node by using a first function for receiving input of attribute information on each terminal node to which the respective higher node connects and outputting attribute information on a higher node.

5. The classification method according to claim 1, further comprising:
    a step of specifying that calculates attribute information on each higher node using a first function for receiving input of attribute information on each terminal node to which the respective higher node connects and outputting attribute information on a higher node in the tree structure data constructed from a series of communications with a single communication destination or multiple communication destinations that take place when software that is software of a known type is executed, and that specifies a type of the software using a second function for receiving input of attribute information on a highest node and outputting a type of software; and
    a step of changing that changes the first function and the second function such that an error between the type of the software specified by the step of specifying and a type of actual software becomes small.

6. The classification method according to claim 1, wherein the step of constructing constructs the tree structure data in which pieces of attribute information relating to multiple communications with a same communication destination are put together as a single terminal node in a series of communications with a single communication destination or multiple communication destinations that take place when the software is executed.

7. A classification device, comprising:
   a memory; and
   processing circuitry coupled to the memory that executes a process comprising:
   constructing tree structure data in which attribute information relating to a single communication or multiple communications serves as a terminal node, from a series of communications along a timeline with a single communication destination or multiple communication destinations that each take place at a time instance when software is executed wherein there are a plurality of terminal nodes, and the step of constructing is performed by repeating a process of initially creating at least one higher node connecting at least two terminal nodes of the plurality of terminal nodes based on a high similarity of attribute information or a predetermined characteristic of communication occurrence times among the plurality of terminal nodes, and creating a new higher node connecting remaining nodes, including terminal nodes or higher nodes, among the current nodes in the tree structure based on a high similarity of attribute information or the predetermined characteristic of communication occurrence times among nodes that are not already connected to each other by a higher node, wherein each higher node shares the timeline with the terminal nodes;
   calculating attribute information on each of the created higher nodes based on attribute information on the terminal nodes to which the respective higher node connects; and
   classifying the software by specifying a type of the software based on attribute information on a highest node created in the tree structure.

8. A non-transitory computer-readable recording medium having stored a classification program for causing a computer to execute a process comprising:
   a step of constructing tree structure data in which attribute information relating to a single communication or multiple communications serves as a terminal node, from a series of communications along a timeline with a single communication destination or multiple communication destinations that each take place at a time instance when software is executed wherein there are a plurality of terminal nodes, and the step of constructing is performed by repeating a process of initially creating at least one higher node connecting at least two terminal nodes of the plurality of terminal nodes based on a high similarity of attribute information or a predetermined characteristic of communication occurrence times among the plurality of terminal nodes, and creating a new higher node connecting remaining nodes, including terminal nodes or higher nodes, among the current nodes in the tree structure based on a high similarity of attribute information or the predetermined characteristic of communication occurrence times among nodes that are not already connected to each other by a higher node, wherein each higher node shares the timeline with the terminal nodes;
   a step of calculating attribute information on each of the created higher nodes based on attribute information on the terminal nodes to which the respective higher node connects; and
   a step of classifying the software by specifying a type of the software based on attribute information on a highest node created in the tree structure.

* * * * *